M. H. WINSLOW.
RECORDING DEVICE FOR SCALES.
APPLICATION FILED FEB. 20, 1911.
1,037,701.
Patented Sept. 3, 1912.
2 SHEETS—SHEET 1.
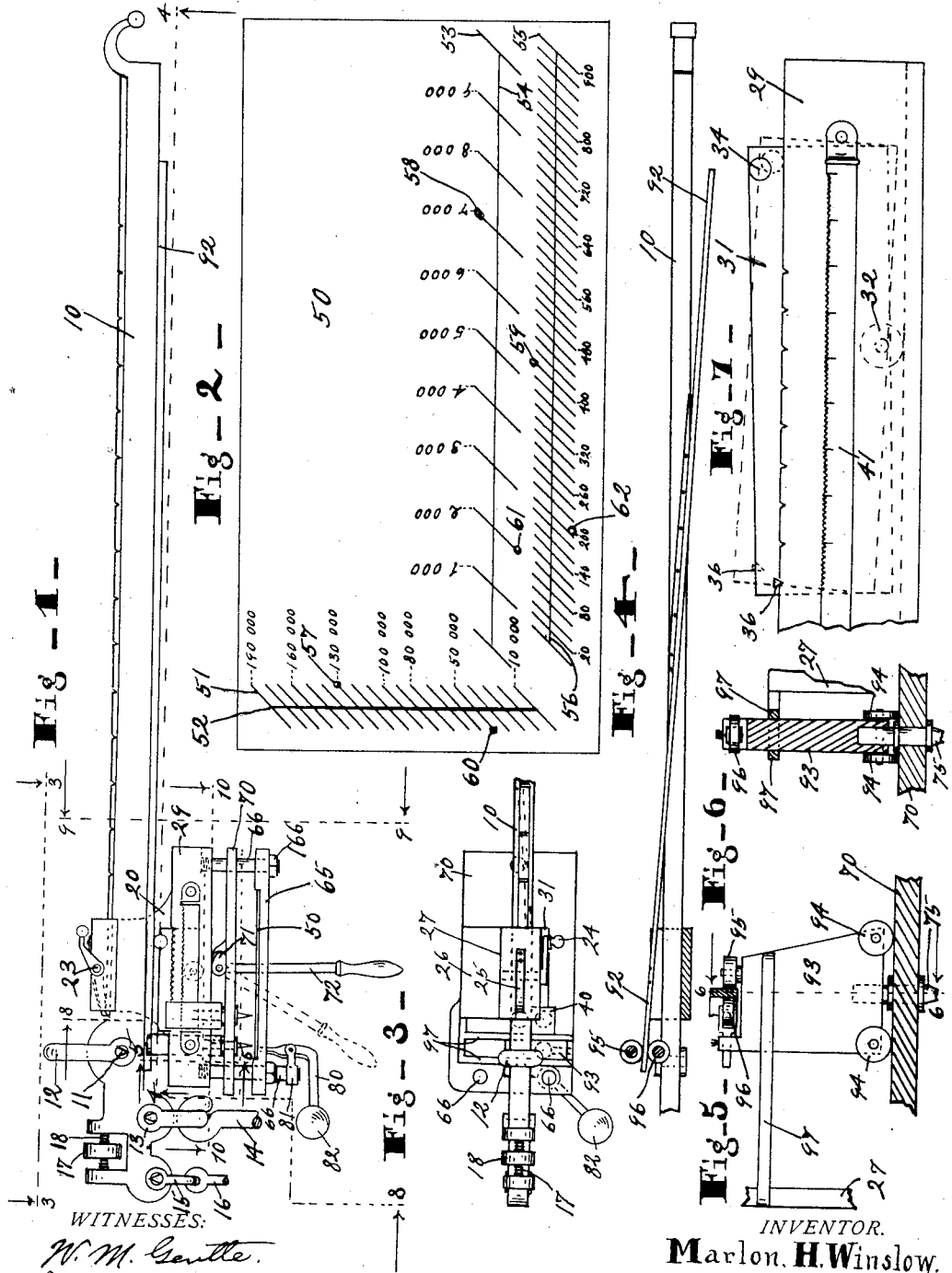
WITNESSES:
W. M. Gentle
N. Connell
INVENTOR.
Marlon. H. Winslow.
BY J. H. Lockwood
ATTORNEY.

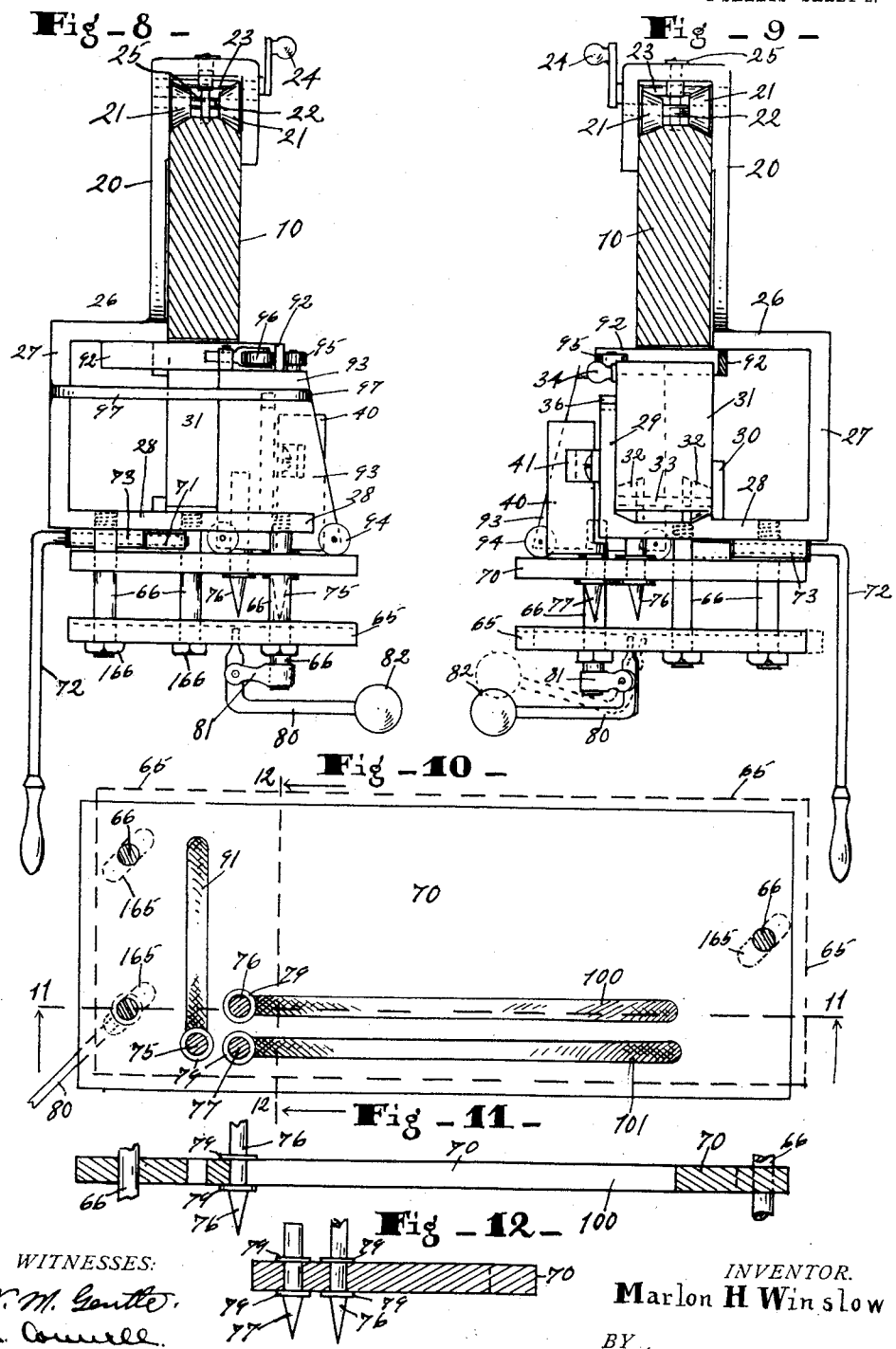

UNITED STATES PATENT OFFICE.

MARLON H. WINSLOW, OF TERRE HAUTE, INDIANA.

RECORDING DEVICE FOR SCALES.

1,037,701.

Specification of Letters Patent. Patented Sept. 3, 1912.

Application filed February 20, 1911. Serial No. 609,772.

*To all whom it may concern:*

Be it known that I, MARLON H. WINSLOW, of Terre Haute, county of Vigo, and State of Indiana, have invented a certain useful Recording Device for Scales; and I do hereby declare that the following is a full, clear, and exact description thereof, reference being had to the accompanying drawings.

The object of this invention is to provide a practical device for recording the gross and tare weights indicated by weighing scales. It effects this object by punching or marking in a card, which has suitable graduations, holes for indicating either the gross weight, tare weight, or both. One set of punches or marks is used for recording on the card both the gross weight and tare weight by merely shifting the position of the card. The position of the various punches or marks is predetermined by the different poises employed in balancing the scale and registering the weight. To that end there are three different poises herein shown, one a 10,000 pound poise, another a 1000 pound poise, and still another a 20 pound poise. The 1000 pound poise and its scale bar are carried by the 10,000 pound poise, and the 20 pound poise and its scale bar are carried by the 1000 pound poise.

The invention is not necessarily limited to the details of the construction shown. The weight is recorded in a card which is readily put in and removed from the device, so that the operator will have one card for each operation of the scales, and, therefore, for each load, and that card will show both the tare weight and the gross weight.

The nature of the invention will be understood from the accompanying drawings and the following description and claims.

In the drawings, Figure 1 is a side elevation of the scale beam and the weight recording mechanism associated therewith, parts being broken away, and the recording parts being indicated by dotted lines. Fig. 2 is a plan view of the card on which the record is made. Fig. 3 is a plan view from the line 3—3 of Fig. 1. Fig. 4 is a section on the line 4—4 of Fig. 1. Fig. 5 is a section on the line 5—5 of Fig. 1. Fig. 6 is a section on the line 6—6 of Fig. 5. Fig. 7 is a portion of what appears in Fig. 1 but on a larger scale. Fig. 8 is a section on the line 8—8 of Fig. 1. Fig. 9 is a section on the line 9—9 of Fig. 1. Fig. 10 is a section on the line 10—10 of Fig. 1, the tare line position of the recording card being indicated by dotted lines. Fig. 11 is a section on the line 11—11 of Fig. 10. Fig. 12 is a section on the line 12—12 of Fig. 10.

In the drawings, 10 represents an ordinary scale beam of a platform or other weighing scale, fulcrumed on the pin 11 in the stirrup 12.

13 is a stirrup pivoted to the scale beam and connected with the rod 14 which runs to the load receiving member, not shown, and through which the influence of the load receiving member, under load, is transmitted to the beam 10. A stirrup 15 is pivoted to the rear end of the beam 10 and is connected with a rod 16 on which a suitable counterbalancing means is placed. The balance weight 17 on the threaded end of the rod 18 is another counterbalancing or adjusting means. The parts so far described are of common knowledge.

The scale beam is notched on its upper edge, and each notch represents 10,000 pounds, and the beam is also provided with a graduated scale in pounds. The total recording mechanism constitutes the 10,000 pound poise, and such total recording mechanism contains a 1000 pound poise and a twenty pound poise, as will hereafter appear.

The total recording mechanism and the 10,000 pound poise are shown in Figs. 8 and 9. In the first place, there is a hanger 20 adapted to overlap the top edge of the beam and ride upon the beam, said hanger being provided with roller bearings 21 which support it on the beam. Said hanger is provided with a pawl or catch 22 fulcrumed on a shaft 23 which extends through the hanger and has a crank arm 24 thereon. The pawl is pressed by a flat spring 25 into engagement with the notches in the upper edge of the scale beam 10, and the pawl is elevated out of said notches by the handle 24 when one desires to return the device.

To the lower end of the hanger 20 a frame is secured, as shown in Figs. 1, 8 and 9, having an upper horizontal portion 26, a vertical portion 27, a lower horizontal portion 28, and an upward extension 29. There is also an intermediate upward extension 30. Said upward extensions 29 and 30 are guides for guiding the 1000 pound poise 31, see Fig. 9. This poise travels upon a pair of conical rollers 32 on the shaft 33, which rollers are slidable along the bottom of the plate 28. The upper end of the poise has a knob 34 whereby it is moved longitudinally of the beam.

The front plate 29 of the frame formed by the parts 26, 27, 28 and 29 is shown in Fig. 7 and is in the nature of a beam with 1000 pound notches in the upper edge thereof, and the 1000 pound poise 31 is held in place by a triangular pin 36 which projects from said poise and it is held in the notches by gravity, as the rollers 32 are to one side of the center of gravity of the poise 31, that is, they are nearer the end of the poise 31, which is remote from the pin 36. When it is desired by hand to move the poise 31 along the plate 29, one bears down on the knob 34 and tips the poise 31 so that the lug 36 will disengage its notch and the plate 29.

The 20 pound poise 40 is slidable along the 20 pound scale beam 41, which is secured to the front face of the plate 29, or what may be termed the 1000 pound scale beam. The beam 41 is like any ordinary weighing beam, having notches and 20 pound graduations.

The foregoing describes the three sets of beams and poises, 10 being the 10,000 pound scale beam, and the whole recording mechanism being the 10,000 pound poise, 29 being the 1000 pound scale beam and the poise 31 the 1000 pound poise, and 41 being the 20 pound scale beam and 40 the 20 pound poise. It is thus seen that the 20 pound scale beam and poise are carried by the 1000 pound scale beam, while the 1000 pound scale beam and poise are carried by the 10,000 pound poise. Therefore, these various scale beams and poises coöperate in weighing. In operation, the 10,000 pound poise construction shown at the left-hand of Fig. 1 is moved to the right along the scale beam until it substantially balances. Then the 1000 pound poise 31 is moved along the scale beam 29 until it substantially balances. Then the 20 pound poise 40 is moved along the scale beam 41 until the whole construction accurately balances.

The foregoing constitutes what may be termed the weighing part of the mechanism. The recording part will now be explained.

The weight is recorded by punching holes in, or otherwise marking, the removable card 50, see Fig. 2. This card has a row of 10,000 pound graduations 51 at the left-hand end of the card and numbered from 10,000 up to 190,000. Then there are 1000 pound graduating lines 53 numbered from 1000 up to 9000, and then there are indicating lines 55 for 20 pounds each and which are numbered from 20 up to 900. All of these lines 51, 53 and 55 are at an inclination and parallel with the same plane. Each series of oblique graduating lines is provided with a central line running through the series, such as lines 52, 54 and 56. A punch or mark placed above or beyond one of the dividing lines indicates the gross weight, and a punch or mark placed below or to the left of the dividing lines indicates the tare weight. Thus, the punches 57, 58 and 59 show that the total weight recorded is 137,400 pounds, while the tare weight is indicated by the punches 60, 61 and 62 to be 52,200 pounds.

The recording card 50, as shown in Fig. 1, lies flat upon a horizontal plate 65 which is supported on three pins 66 and nuts 166 below the part 28 of the frame. The part 65 has slots 165, as indicated in Fig. 10, through which the pins or bolts 66 extend, and these slots are all arranged parallel with the same plane as the various scale graduations on the card. This plate 65 is recessed somewhat between its ends in order to receive and hold said card.

The punch plate 70 is parallel and above the plate 65 and vertically reciprocable with reference to the poise 31 on the bolt 66 by a cam 71 on the bent inner end of the hand-lever 72, which is oscillatable in the bearings 73 secured to the bottom of the frame 28. When the lever 72 is moved from the full-line to the dotted-line position in Fig. 1, the plate 70 will be depressed and the punches 75, 76 and 77, see Figs. 10 and 12, and thereby three holes punched in the card. The punches have collars 79 on each side of the plate 70, whereby they are moved by the movement of the plate. If the card is in one position, the punches will punch the holes 51, 58 and 59. If the card be in another position they will punch the holes 60, 61 and 62. The card is moved from one position to the other according to the slots 165 and the pins 66 by the weighted lever 80, which is fulcrumed on the bracket 81 on one of the pins 66 and has its upper end projecting into a hole in the plate 65. When the weight 82 on said lever 80 is lifted to the dotted-line position shown in Fig. 9, it will move the plate 65 carrying the recording card in a direction parallel with the planes of the slots 165 and the scale graduations on the card. This movement is indicated by the dotted lines in Fig. 10. Normally, the punches will punch the holes at 57, 58 and 59 in the card, but when the card has been moved by the lever 80 and the punches operated, they will punch the holes 60, 61 and 62 and indicate the tare weight.

The position of the punches is automatically determined by the following means: The 10,000 pound punch 75 is movable along the slot 91 in the plate 70, see Fig. 10, by the stationary inclined bar 92, which is secured on the underside of the main beam 10, see Figs. 1 and 4. As shown in Figs. 5 and 6, there is a block 93 to which the punch 75 is secured and from which it extends down to the slot 91 in the plate 70. This block 93 is carried on plate 73 by little rollers 94 to prevent friction. It has on its upper end a pair of little rollers 95 and 96, which move along the guide bar 92. It is obvious that as the 10,000 pound poise, heretofore described, is moved along the beam 10 toward the outer end, the inclined bar 92 will move the block 93 and punch 75 along the slot 91 from the initial or normal position shown in Fig. 10, and, therefore, in a position to cause the punch to punch a hole farther up on the scale of graduations in the card as the poise is further moved outward the end of the beam 10. The block 93 is held upright by a pair of guides 97, see Figs. 5, 6 and 8, which extend from the part 27 of the frame.

The 1000 pound punch 76 is moved and adjusted as follows: It projects through and is moved along a slot 100 parallel with the plate 70, and, therefore, parallel with the 1000 pound graduations on the card. Said punch extends downwardly from the 1000 pound poise 31, see Figs. 1 and 9. Therefore, as the poise 31 is moved along its scale beam 29, see Fig. 7, the punch will be moved farther along to the right in the slot 100 and caused to punch at the desired place in the card when the punch is operated.

The 20 pound punch 77 is secured to the 20 pound poise 40, see Fig. 9, and it projects through a slot 101 in plate 70, see Fig. 10, and is moved like the other punch while adjusting the poise. Therefore, when the three sets of poises have been properly positioned to balance the load, the punches will be in proper position with relation to the card to punch holes so as to indicate the gross weight, or, if the card is properly shifted, the tare weight.

I claim as my invention:

1. A weighing scale including a main scale beam, a poise for said scale beam adapted to hold a recording card provided with suitable graduations, a marker movable toward and away from said card and also in a plane parallel with said card for indicating the weight on the card, and means secured to the main scale beam for moving said marker in a plane parallel with said card as the poise is moved along the scale beam.

2. A weighing scale including a main scale beam, a poise for said scale beam adapted to hold a recording card provided with suitable graduations adapted to be placed in said poise, a plate movable toward and from said card and provided with a slot, a marker operable through said slot for indicating the weight on the card, and means secured to the main scale beam for moving said marker along the slot in said plate as the poise is moved along the scale beam.

3. A weighing scale including a main scale beam, a poise for said scale beam adapted to hold a recording card provided with suitable graduations, a marker for indicating the weight on the card, and a guide secured on the underside of the main scale beam and at an angle therewith for causing the movement of the marker with reference to the card.

4. A weighing scale including a main scale beam, a poise slidable thereon and adapted to hold a card provided with graduations, a marker movable toward and away from said card and also in a plane parallel with said card, a block for causing the movement of the marker, a pair of rollers on said block, and a guide bar secured on the underside of the main scale beam and extending between said rollers so as to move the block and marker as the poise is moved along the scale beam.

5. A weighing scale including a main scale beam, a poise slidable thereon adapted to hold a card provided with suitable graduations, a plate movable toward and away from said card and provided with a slot, a marker projecting through said slot, a block movable on said plate and to which said marker is attached, a pair of rollers on said block, and a guide bar secured to the underside of the main scale beam and extending between said rollers so as to move the block and marker as the poise is moved along the scale beam.

6. A weighing scale including a main scale beam, a poise, slidable thereon, adapted to hold a card provided with a plurality of series of graduated marks each series representing different variations in weight, a marker carried by said poise for the highest series of marks on said card, means on the main scale beam for adjusting said marker, a marker for the lower series of marks on the card, a poise carrying said marker, a scale beam connected with the main poise for carrying said second poise, and means for operating said markers.

7. A weighing scale including a main scale beam, a poise slidable thereon adapted to hold a card provided with a plurality of series of graduated marks each series representing different variations in weight, a marker carried by said poise for the highest series of marks on said card, means on the main scale beam for adjusting said marker, a marker for the lower series of marks on the card, a poise carrying said marker, a marker carried for a still lower series of marks on the card, a poise carrying said marker, a scale bar carried by the main poise for said last-mentioned poise, a scale bar carried by said last-mentioned poise, a third poise for said last-mentioned scale bar, a marker carried by said last-mentioned poise for the lowest series of marks on said card, and means for operating said markers.

8. A weighing scale including a poise adapted to hold a card provided with suitable graduated marks all of said marks extending in the same direction, numerals associated with said marks, lines across the rows of marks and midway thereof, means forming a part of the poise for marking said card, a plate for carrying said card which is movable in one direction, and a weighted lever for shifting said plate arranged so that the weight will hold the plate in its normal position.

9. A weighing scale including a scale beam with notches on the upper edge, a support extending along the sides of said scale beam, a poise for said scale beam, rollers mounted on said poise to one side of the center of gravity and adapted to travel on said support, and a lug projecting from the heavy end of said poise for engaging the notches of the scale beam, whereby by pressing down on the other end of said poise said lug will be disengaged from the notches and may be moved along the scale beam.

In witness whereof, I have hereunto affixed my signature in the presence of the witnesses herein named.

MARLON H. WINSLOW.

Witnesses:
JOE BUNCH,
MIKE MCKINLEY.

Copies of this patent may be obtained for five cents each, by addressing the "Commissioner of Patents, Washington, D. C."